United States Patent
Edukulla

(10) Patent No.: US 10,846,302 B1
(45) Date of Patent: Nov. 24, 2020

(54) REPLICATION EVENT ORDERING USING AN EXTERNAL DATA STORE

(71) Applicant: Amazon Technologies, Inc., Seattle, WA (US)

(72) Inventor: Santhosh Edukulla, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 293 days.

(21) Appl. No.: 15/910,997

(22) Filed: Mar. 2, 2018

(51) Int. Cl.
G06F 16/27 (2019.01)
G06F 16/23 (2019.01)

(52) U.S. Cl.
CPC .......... *G06F 16/27* (2019.01); *G06F 16/2358* (2019.01)

(58) Field of Classification Search
None
See application file for complete search history.

(56) References Cited

U.S. PATENT DOCUMENTS

| 7,769,727 | B2 | 8/2010 | Sivapragasam et al. |
| 8,010,887 | B2 | 8/2011 | Soria, Jr. et al. |
| 8,538,926 | B2* | 9/2013 | Barton .................... G06F 16/27 707/652 |
| 8,812,539 | B2 | 8/2014 | Milousheff et al. |
| 9,195,686 | B2 | 11/2015 | Gallardo et al. |
| 2002/0099728 | A1* | 7/2002 | Lees ....................... G06F 16/27 |
| 2003/0088615 | A1* | 5/2003 | Good ....................... G06F 16/23 709/203 |
| 2004/0148317 | A1* | 7/2004 | Sundararajan ........ G06F 16/275 |
| 2005/0010666 | A1* | 1/2005 | Nanda .................. H04L 61/1558 709/225 |
| 2007/0026373 | A1* | 2/2007 | Suriyanarayanan ...... G06F 8/00 434/322 |
| 2007/0299887 | A1* | 12/2007 | Novik .................... G06F 16/273 |
| 2012/0233418 | A1* | 9/2012 | Barton ................... G06F 3/0644 711/162 |
| 2015/0215152 | A1* | 7/2015 | Caldwell ............. H04L 67/1095 709/202 |
| 2016/0077927 | A1* | 3/2016 | Bhargava ............. G06F 11/1458 707/645 |
| 2017/0302589 | A1* | 10/2017 | Leafe .................. H04L 63/0892 |

\* cited by examiner

Primary Examiner — Kim T Nguyen
(74) Attorney, Agent, or Firm — Robert C. Kowert; Kowert, Hood, Munyon, Rankin & Goetzel, P.C.

(57) ABSTRACT

Methods, systems, and computer-readable media for replication event ordering using an external data store are disclosed. Events are received for a key in a source data store, including a deletion event and modification events. In an external data store, a record of the deletion event is stored that includes a sequence identifier of the deletion event in a sequence. Sequence identifiers are assigned to the modification events. Some of the sequence identifiers are earlier than the deletion event in the sequence, and others of the sequence identifiers are later than the deletion event in the sequence and are assigned based at least in part on the record of the deletion event in the external data store. Individual events are replicated or not replicated to the destination data store based at least in part on their sequence identifiers.

20 Claims, 13 Drawing Sheets

US 10,846,302 B1

REPLICATION EVENT ORDERING USING AN EXTERNAL DATA STORE

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

Figure 1:
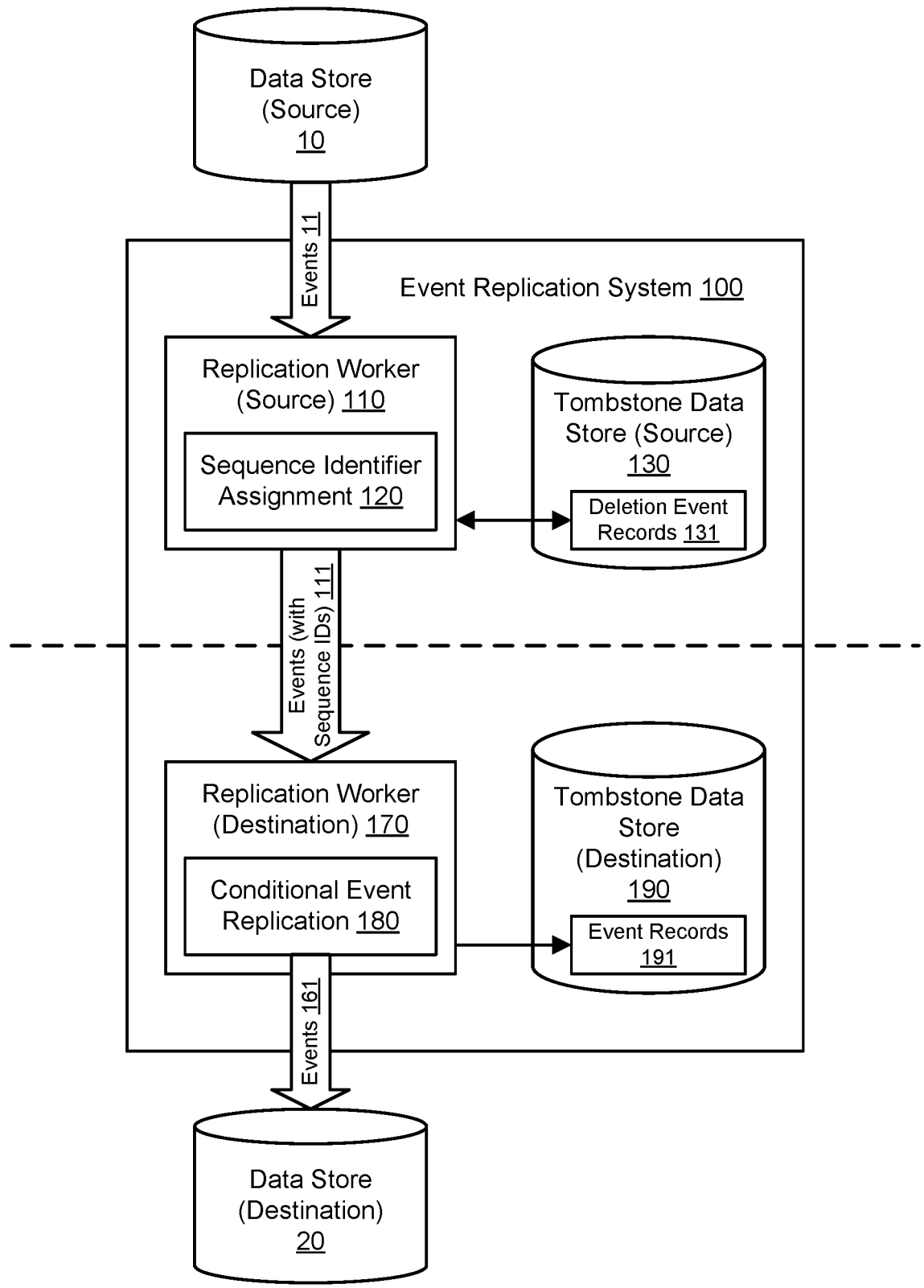
FIG. 1 illustrates an example system environment for replication event ordering using an external data store, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for replication event ordering using an external data store are described. Using the techniques described herein, distributed replication of data store events may be performed from a source to a destination such that the source and the destination are eventually consistent. Events including creation events, modification events, and deletion events for a key (or other data) in a source data store may be assigned individual sequence numbers. The sequence numbers may indicate the logical order of events in a sequence of events associated with the key. Also on the source side, a source tombstone data store may be used to maintain a record of deletion events for the key in the source data store. In one embodiment, a previously deleted key may be recreated and/or modified in the source data store. Instead of using a restarted sequence number for a subsequent recreation or modification event, later (post-deletion) events may be assigned sequence numbers that continue the sequence that included the deletion. For example, if a deletion event for the key is assigned a vector version of [3, 0], then a subsequent recreation event for the key may be assigned a vector version of [4, 0] in the same sequence rather than a vector version of [1, 0] in a new sequence. In one embodiment, a sequence identifier for a new (post-deletion) event may be generated by adding the sequence identifier of the deletion to the sequence identifier of the new event in a restarted sequence. Events and their sequence identifiers may be provided to the destination side and logged in a destination tombstone data store. The destination tombstone data store and the sequence numbers stored therein may be used to derive the logical order of events and determine which events to apply to the destination data store and which events to discard. For example, if the latest event applied to the destination data store is a deletion event with vector clock [3, 0], then a modification event with vector clock [5, 0] may be applied to the destination. As another example, if the latest event applied to the destination data store is the modification event with vector clock [5, 0], then a creation event with vector clock [1, 0] may not be applied to the destination. Using these techniques, events may be optimistically replicated in a distributed data store without modification to the source or destination data stores.

As one skilled in the art will appreciate in light of this disclosure, embodiments may be capable of achieving certain technical advantages, including some or all of the following: (1) improving the accuracy of replication from a source destination store to one or more destination data stores, (2) reducing demands on developer time and computing resources for modifying source and destination data stores to maintain correct sequence identifiers, (3) reducing storage requirements for the primary source and destination data stores, (4) improving the scalability of a distributed data store across multiple zones or regions, (5) improving the use of network resources for sending replication events as bandwidth allows by implementing tolerance for out-of-order replication events, (6) eliminating the need to deliver events in order for replication, etc.

FIG. 1 illustrates an example system environment for replication event ordering using an external data store, according to one embodiment. The example system environment may include an event replication system 100 that implements optimistic and eventually consistent replication from a source data store 10 to a destination data store 20. The event replication system 100 may include various modules, components, or functionalities such as a replication worker 110 on the source side and a replication worker 170 on the destination side. In one embodiment, the source data store 10 and the destination data store 20, along with their corresponding event replication components, may be located in different geographical zones or regions of a distributed system. In one embodiment, the source data store 10 and the destination data store 20, along with their corresponding event replication components, may be located in the same geographical zone or region of a distributed system. The data stores 10 and 20 may be implemented by a database service of a distributed system. The data stores 10 and 20 may also be referred to as primary data stores.

In one embodiment, the event replication system 100 may be implemented primarily using components external to the data stores 10 and 20 and external to the database service that hosts the data stores. For example, the event replication system 100 may use an external data store such as a source tombstone data store 130 to maintain records 131 of deletion events (said records representing "tombstones" for deleted data) in the source data store 10. As another example, the event replication system 100 may use an external data store such as a destination tombstone data store 190 to maintain records of events such that the correct order of incoming events may be determined on the destination side. By using external components such as the workers 110 and 170 and external data stores 130 and 190, the event replication system 100 may permit the primary data stores 10 and 20 to be used without further modification.

The data stores 10 and 20 may store data using key-value data structures, where one or more values are associated with a partition key. Key-value structures may be referred to herein as records. As records are created, modified, and/or deleted in the source data store 10, events 11 may be generated that describe the creation, modification, and/or deletion of records. In one embodiment, modification events may include creation events. In one embodiment, the events 11 may be streamed using an event streaming service or subsystem. The events 11 may be generated over a period of time and may include timestamps or other indications of the sequence in which they were applied to the source data store 10. On the source side, one or more replication workers such as worker 110 may listen to the events. In one embodiment, a fleet or pool of replication workers may handle events for a variety of users, datasets, or partition keys in the data store 10, and a particular replication worker 110 may listen for events associated with one or more particular partition keys.

Upon receipt by the replication worker 110, an event may be assigned a sequence identifier by a component 120 for sequence identifier assignment. A sequence identifier may include a numerical value or other indication that uniquely identifies the position of a particular event in a sequence or logical order of events involving a particular partition key. In one embodiment, a sequence identifier may be associated with a vector clock or vector version. For example, a first event for a particular key may be assigned a vector clock of [1, 0], where the first position in the vector represents the source node, the '1' indicates that the event is the first in a sequence for the partition key, and the second position in the vector represents the destination node. Subsequent events involving the same partition key may be assigned sequence identifiers that are monotonically increasing, such as [2, 0], [3, 0], and so on. Using the component 120 for sequence identifier assignment, the sequence identifiers may be injected into events 111 that are then provided to one or more replication workers on the destination side, such as worker 170.

In one embodiment, events 111 may be received on the destination side out of order, i.e., in a different order than the order in which the events were performed on the source side (as captured by the sequence identifiers). Using a component 180 for conditional event replication, the sequence identifiers may be used to derive or determine the partial order of events on the destination side so that events 161 may be either replicated to the destination data store 20 or dropped, depending on the order in which the events are received. For example, if a modification event with a vector clock of [5, 0] is received after a deletion event with a vector clock of [3, 0] is applied to the destination data store 20, then the modification event may be replicated to the destination because its vector clock indicates that it is later in the sequence than the most recently processed event on the destination side. As another example, if a creation event with a vector clock of [1, 0] is received after the modification event with a vector clock of [5, 0] is applied to the destination data store 20, then the creation event may be dropped or discarded and not replicated to the destination because its vector clock indicates that it is earlier in the sequence than the most recently processed event on the destination side. In one embodiment, the replication worker 170 may log event records 191 to an external tombstone data store 190, even if some of the events are not replicated to the destination data store 20.

In one embodiment, the source data store 10 may remove all metadata for a partition key if that key is deleted. In one embodiment, if that partition key is then recreated, the source data store 10 (or the database service that hosts it) may restart a sequence from the beginning, with no reference to prior events up to the deletion event. Because the sequence is restarted by the source data store 10, post-deletion events may incorrectly appear to occur before the deletion or may share sequence identifiers with pre-deletion events unless their sequence identifiers are corrected. In one embodiment, to permit post-deletion events to continue in a pre-deletion sequence, the source tombstone data store 130 may be used to maintain records 131 of deletion events for partition keys in the source data store 10. For example, a deletion event for a particular key may be stored in the tombstone data store 130 with a vector clock of [3, 0]. In assigning sequence identifiers to events for a particular key, the replication worker 110 may check the tombstone data store 130 to determine whether there are any prior deletions for that key. If the key is subsequently recreated, then post-deletion events for that key may be assigned sequence identifiers such as [4, 0], [5, 0], and so on, in order to continue the sequence that led up to the deletion event, instead of using the restarted sequence identifiers [1, 0], [2, 0], and so on, as provided by the source data store 10 with no knowledge of the prior deletion. In one embodiment, the component 120 for sequence identifier assignment may add the sequence identifier for the most recent deletion to the sequence identifier provided by the source data store 10. For example, for an event that recreates a key after deletion of that key, the deletion vector clock of [3, 0] may be added to the restarted vector clock of [1, 0] to yield a new vector clock of [4, 0]. By modifying the sequence identifiers of post-deletion events in this manner to ensure a continuous sequence, the destination side may be able to determine the proper order of events that are received in an arbitrary order.

In one embodiment, the event replication system 100 may be implemented using resources of a provider network. In one embodiment, the provider network may represent a network set up by an entity such as a private-sector company or a public-sector organization to provide one or more services (such as various types of network-accessible computing or storage) accessible via the Internet and/or other networks to a distributed set of clients. In one embodiment, the provider network may include numerous services that collaborate according to a service-oriented architecture to provide resources such as the source data store 10 and destination data store 20. The provider network may implement a distributed system with components located in different geographical zones or regions. In one embodiment, the provider network may include numerous data centers hosting various resource pools, such as collections of physical and/or virtualized computer servers, storage devices, networking equipment and the like, that are used to implement and distribute the infrastructure and services offered by the provider. In one embodiment, compute resources may be offered to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In one embodiment, the event replication system 100 may be implemented as a service of the provider network, the service may be implemented using a plurality of different instances that are distributed throughout one or more networks, and each instance may offer access to the functionality of the service to various clients. In one embodiment, because resources of the provider network may be under the control of multiple clients (or tenants) simultaneously, the provider network may be said to offer multi-tenancy and may be termed a multi-tenant provider network. In one embodiment, the functionality of the provider network, such as the event replication system 100, may be offered to clients in exchange for fees.

Figure 7:
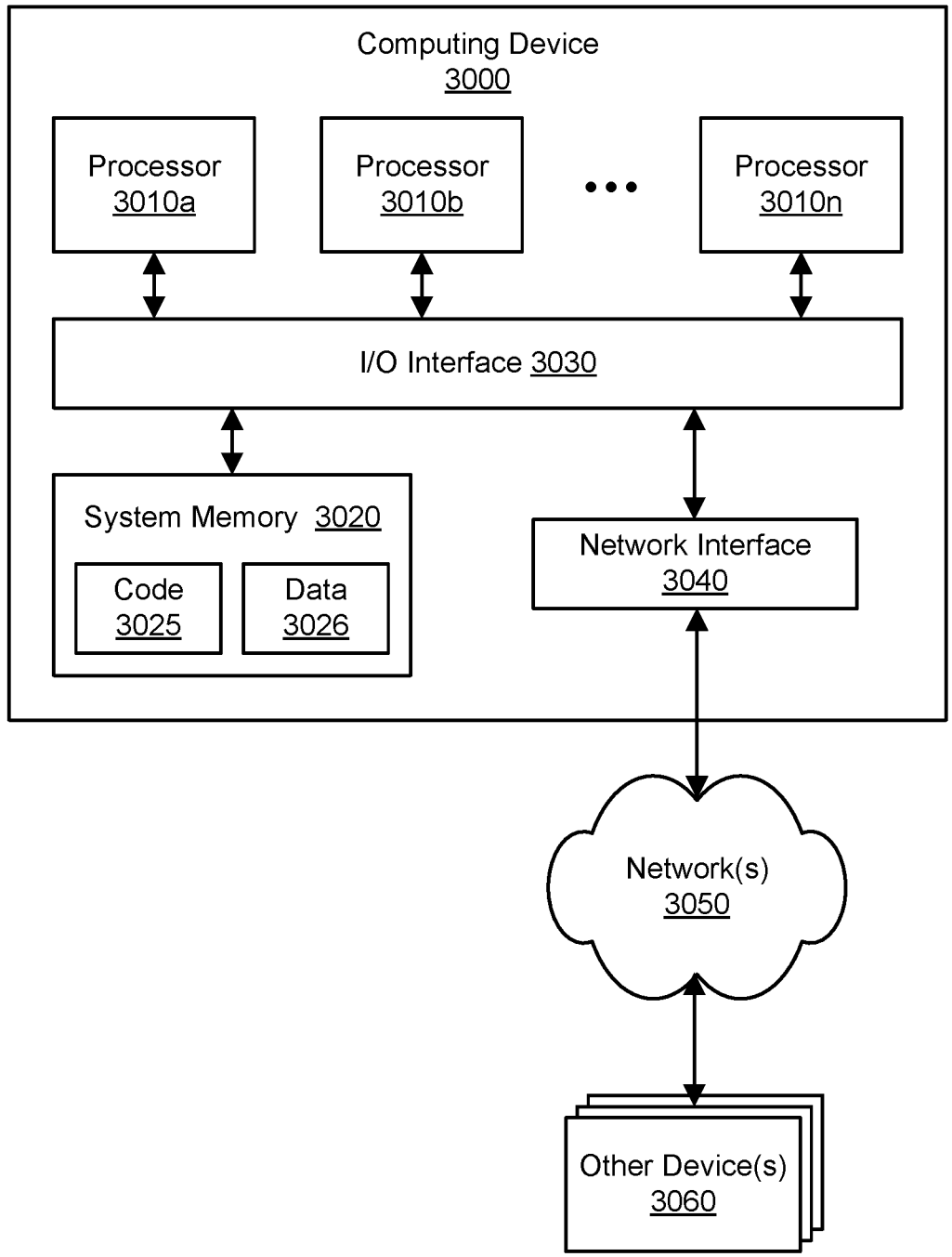
FIG. 7 illustrates an example computing device that may be used in some embodiments.

In one embodiment, the event replication system 100 may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the system 100 may be provided by the same computing device or by different computing devices. In various embodiments, if any of the components of the system 100 are implemented using different computing devices, then the components and their respective computing devices may be communicatively coupled, e.g., via one or more networks. In one embodiment, any of the components of the system 100 may represent any combination of software and hardware usable to perform their respective functions. In some embodiments, operations implemented by the system 100 may be performed automatically, e.g., without a need for user initiation or user intervention after an initial configuration stage, and/or programmatically, e.g., by execution of program instructions on at least one computing device. In some embodiments, the system 100 may include additional components not shown, fewer components than shown, or different combinations, configurations, or quantities of the components shown.

In one embodiment, clients of the system 100 may represent external devices, systems, or entities with respect to the system. In one embodiment, the client device(s) may be implemented using any suitable number and configuration of computing devices, any of which may be implemented by the example computing device 3000 illustrated in FIG. 7. In one embodiment, clients or other components may convey network-based service requests to the system 100 via one or more networks. In various embodiments, the network(s) may encompass any suitable combination of networking hardware and protocols necessary to establish network-based communications between, for example, client devices and the system 100. In one embodiment, for example, the network(s) may generally encompass the various telecommunications networks and service providers that collectively implement the Internet. In one embodiment, the network(s) may also include private networks such as local area networks (LANs) or wide area networks (WANs) as well as public or private wireless networks. In one embodiment, for example, both a given client device and the system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the service system. In one embodiment, client devices may communicate with the system 100 using a private network rather than the public Internet. In various embodiments, the various components of the system 100 may also communicate with other components of the system using one or more network interconnects.

Figure 2:
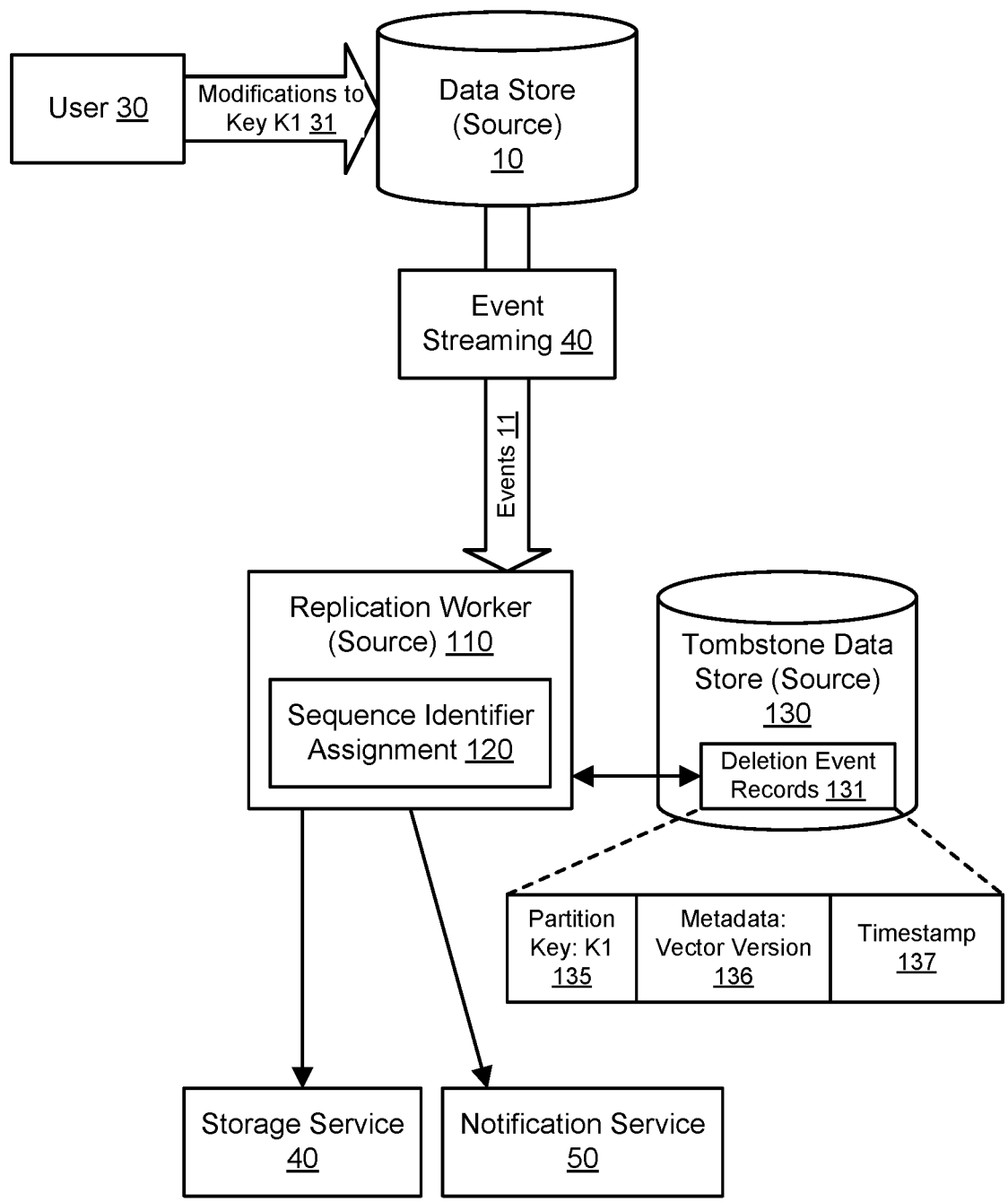
FIG. 2 illustrates further aspects of the example system environment for replication event ordering using an external data store, including components on a source side, according to one embodiment.

FIG. 2 illustrates further aspects of the example system environment for replication event ordering using an external data store, including components on a source side, according to one embodiment. A user 30 may interact with the source data store 10 by supplying requests 31 for modification of a partition key K1. As shown in FIG. 2, the requests 31 may include requests for creation, modification, and/or deletion of values associated with the key K1. In one embodiment, the source data store 10 may interact with an event streaming service or subsystem 40 to generate events 11 describing the modifications 31. The event streaming service or subsystem 40 may include multiple shards of events, and events may be ordered within a shard. In one embodiment, events associated with the key K1 may be processed using a particular shard, while events associated with other keys may be processed using other shards. The events 11 may be provided on an event bus. In one embodiment, the source replication worker 110 may include an event listener that monitors the event bus for events that the worker can handle. In one embodiment, one or more partition keys, including the key K1, may be assigned to the source replication worker 110, and other keys may be assigned to other replication workers on the source side. In one embodiment, the source replication worker 110 may monitor a particular shard of events for the events 11 associated with the partition key K1.

As discussed above, the source replication worker 110 may use the tombstone data store 130 to store deletion event records 131 that represent "tombstones" for deleted partition keys. As shown in FIG. 2, a particular deletion record may include multiple values or components, such as an indication 135 of the partition key K1, metadata 136 indicating the vector version or vector clock of the deletion (e.g., [3, 0]), and a timestamp 137 of the deletion event. The replication worker 110 may use such a record to modify the sequence identifiers of K1-related events occurring after the deletion, such that the sequence leading up to the deletion is continued rather than restarted from the beginning. After assigning sequence identifiers to events 11, the replication worker 110 may upload the events (now including sequence identifiers) to a storage service 40. In one embodiment, the storage service 40 may be provided by the same provider network that hosts the data stores 10 and 20. In one embodiment, the storage service 40 may enable documents such as events to be stored in "buckets." The replication worker 110 may also generate notifications of the events using a notification service 50. In one embodiment, the notification service 50 may be provided by the same provider network that hosts the data stores 10 and 20 and offers the storage service 40. The notification service 50 may implement an event bus that includes the notifications of the events 11.

Figure 3:
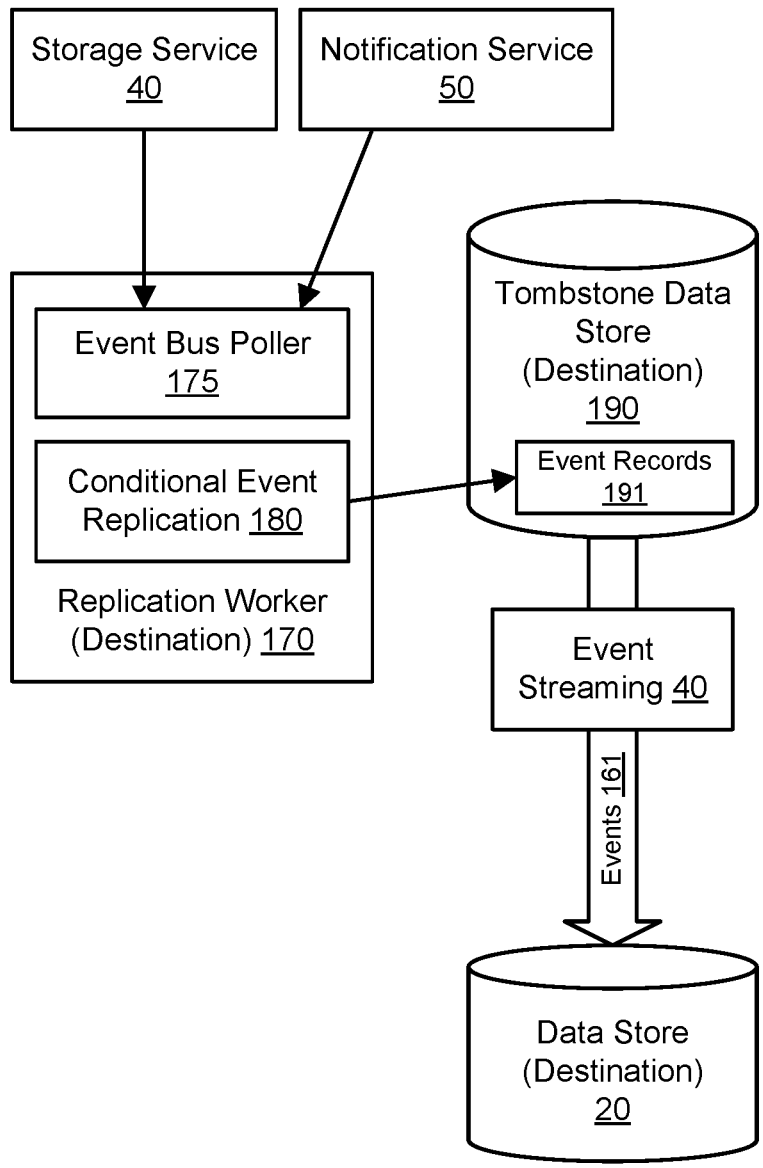
FIG. 3 illustrates further aspects of the example system environment for replication event ordering using an external data store, including components on a destination side, according to one embodiment.

FIG. 3 illustrates further aspects of the example system environment for replication event ordering using an external data store, including components on a destination side, according to one embodiment. In one embodiment, the destination replication worker 170 may include an event bus poller 175 that polls the event bus of the notification service 50. The event bus may include multiple shards of events. In one embodiment, events associated with the key K1 may be processed using a particular shard, while events associated with other keys may be processed using other shards. In one embodiment, one or more partition keys, including the key K1, may be assigned to the destination replication worker 170, and other keys may be assigned to other replication workers on the destination side. In one embodiment, the destination replication worker 170 may monitor a particular shard of events for the events associated with the partition key K1. Upon receiving a notification of an event for the key K1, the destination replication worker 170 may retrieve the event from its location (e.g., a bucket) in the storage service 40.

As discussed above, the destination replication worker 170 may log incoming events to the destination tombstone data store 190, e.g., using event records 191. The component 180 for conditional event replication may determine whether to apply or replicate events 161 to the destination data store 20 or instead discard the events without replication. Using the component 180 for conditional event replication, the sequence identifiers may be used to derive or determine the partial order of events on the destination side so that events 161 may be either replicated to the destination data store 20 or dropped, depending on the order in which the events are received. For example, if a modification event with a vector clock of [5, 0] is the next event received after a deletion event with a vector clock of [3, 0] is replicated to the destination data store 20, then the modification event may also be replicated to the destination because its vector clock indicates that it is later in the sequence than the most recently processed event on the destination side. As another example, if a creation event with a vector clock of [1, 0] is the next event received after the modification event with a vector clock of [5, 0] is replicated to the destination data store 20, then the creation event may be dropped or discarded and not replicated to the destination because its vector clock indicates that it is earlier in the sequence than the most recently processed event on the destination side. In one embodiment, the latest replicated event in the sequence (e.g., the event with the latest sequence identifier that was replicated to the destination data store 20) may be maintained in the tombstone data store 190 so that newly received events can be compared against its sequence identifier.

In one embodiment, updates to the tombstone data store 190 may be replicated to the primary destination data store 20. In one embodiment, the event streaming service or subsystem 40 may monitor the tombstone data store 190 for updates and may generate a stream of events 161. The event streaming service or subsystem 40 may include multiple shards of events originating from the tombstone data store 190. In one embodiment, data store 190 events associated with the key K1 may be processed using a particular shard, while events associated with other keys may be processed using other shards. A replication worker may listen to one or more shards of the event bus, receive events 161 for the partition key K1, and apply the events to the destination data store 20 to complete the replication for those events.

Figure 4A:
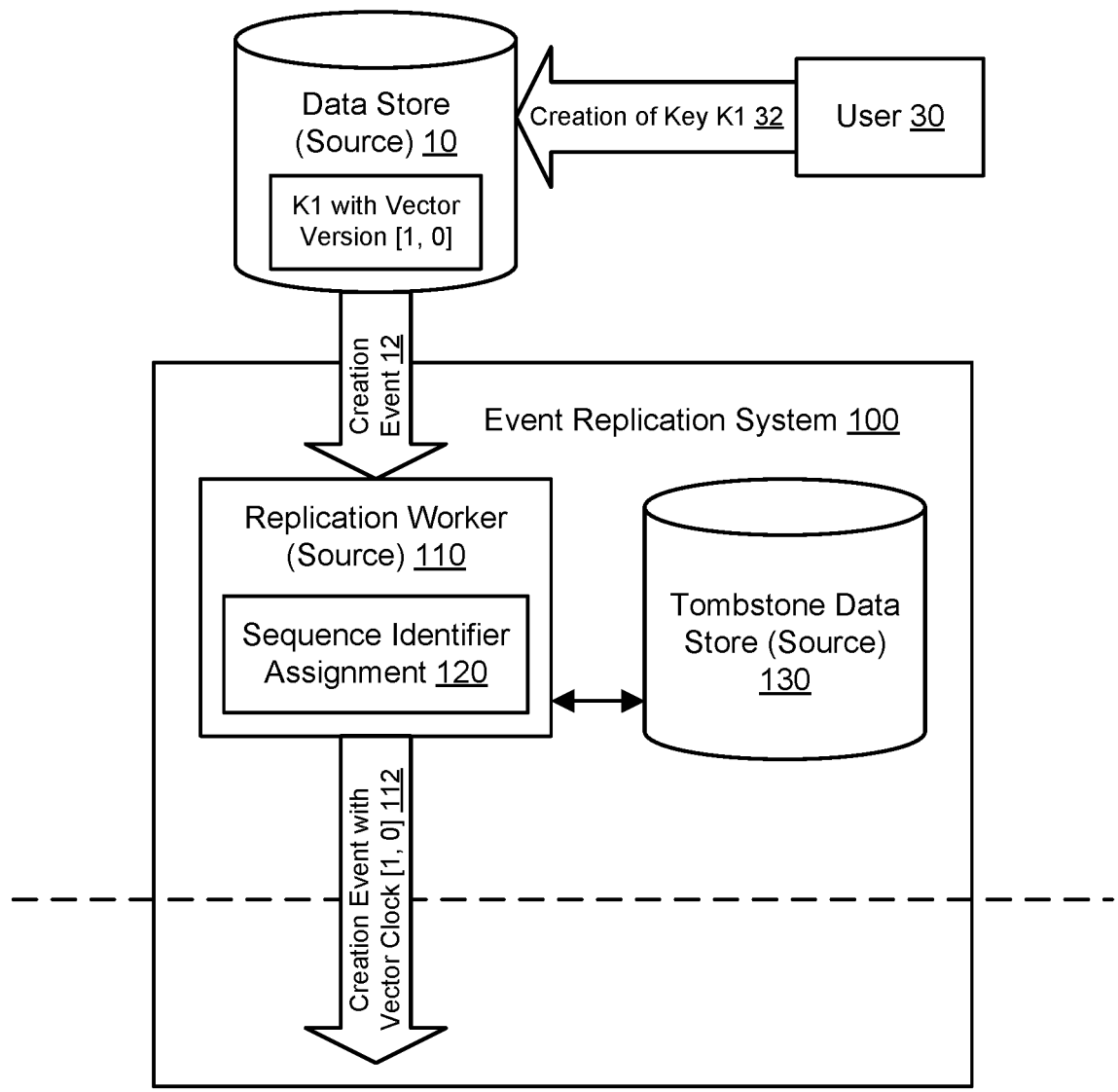
FIG. 4A through FIG. 4E illustrate examples of replication event ordering using an external data store, including generating sequence identifiers by reference to a source tombstone data store, according to one embodiment.

FIG. 4A through FIG. 4E illustrate examples of replication event ordering using an external data store, including generating sequence identifiers by reference to a source tombstone data store, according to one embodiment. In one embodiment, FIG. 4A through FIG. 4E may represent a series of events that affect a particular key (K1) in the source data store 10. As shown in FIG. 4A, a user 30 may interact with the source data store using a request 32 for creation of the key K1. As a result, the key K1 may be created in the source data store 10 with a vector version of [1, 0], where the first position in the vector represents the source node, and its value '1' indicates that the creation event 12 is the first in a sequence of events involving the key K1. The creation event 12 may be provided to a source replication worker 110, e.g., using an event stream. The worker 110 may check the source tombstone data store 130 to determine whether the key K1 has been deleted at any point in the past. Because the key K1 has not previously been deleted, the sequence identifier assignment 120 may maintain the same vector clock [1, 0] for the creation event 112 that is sent to one or more destinations for replication.

Figure 4B:
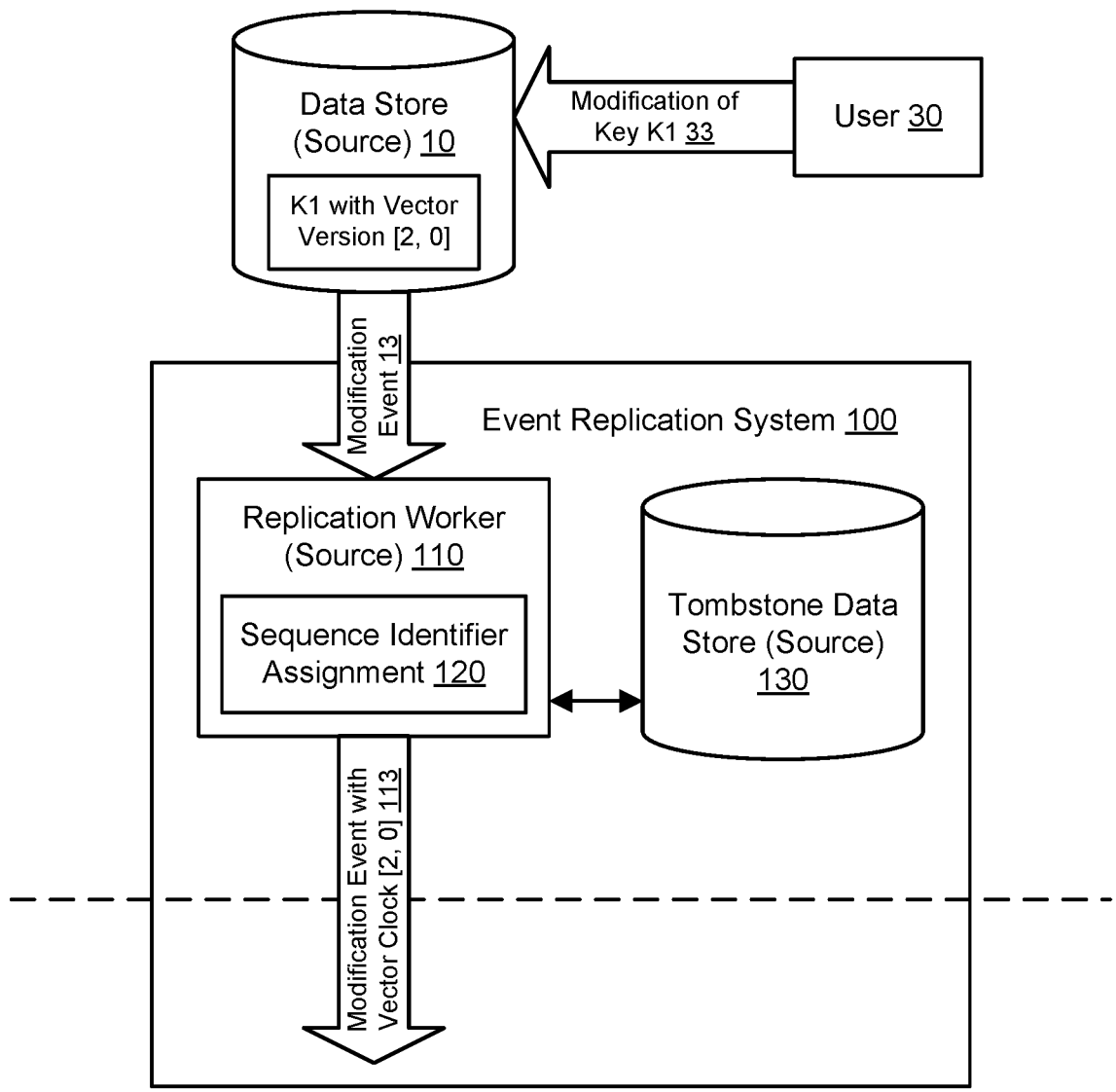

As shown in FIG. 4B, the user 30 may interact with the source data store using a request 33 for modification of the key K1, e.g., by changing one or more values associated with K1. As a result, the data associated with the key K1 may be modified in the source data store 10 with a vector version of [2, 0], where the value '2' indicates that the modification event 13 is the second in the sequence of events involving the key K1. The modification event 13 may be provided to the source replication worker 110, e.g., using an event stream. The worker 110 may check the source tombstone data store 130 to determine whether the key K1 has been deleted at any point in the past. Because the key K1 has not previously been deleted, the sequence identifier assignment 120 may maintain the same vector clock [2, 0] for the modification event 113 that is sent to one or more destinations for replication.

Figure 4C:
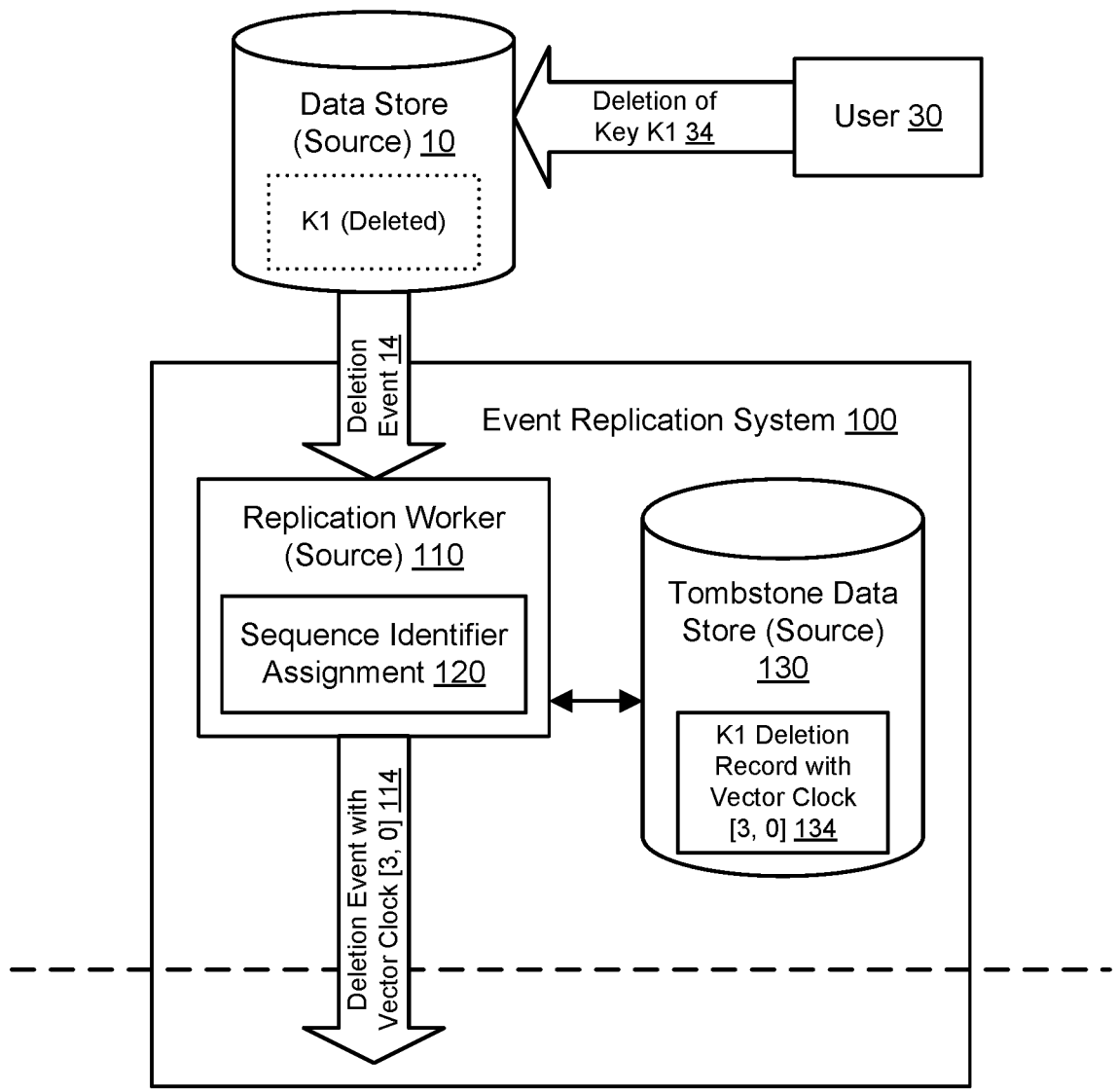

As shown in FIG. 4C, the user 30 may interact with the source data store using a request 34 for deletion of the key K1. As a result, the data associated with the key K1 may be deleted from the source data store 10. A deletion event 14 may be provided to the source replication worker 110, e.g., using an event stream. The worker 110 may update the source tombstone data store 130 to store a deletion record 134 for K1, including the vector clock [3, 0]. The value '3' in the vector clock may indicate that the deletion event 14 is the third in the sequence of events involving the key K1. In one embodiment, because the key K1 has not previously been deleted, the sequence identifier assignment 120 may maintain the same vector clock [3, 0] for the deletion event 114 that is sent to one or more destinations for replication.

Figure 4D:
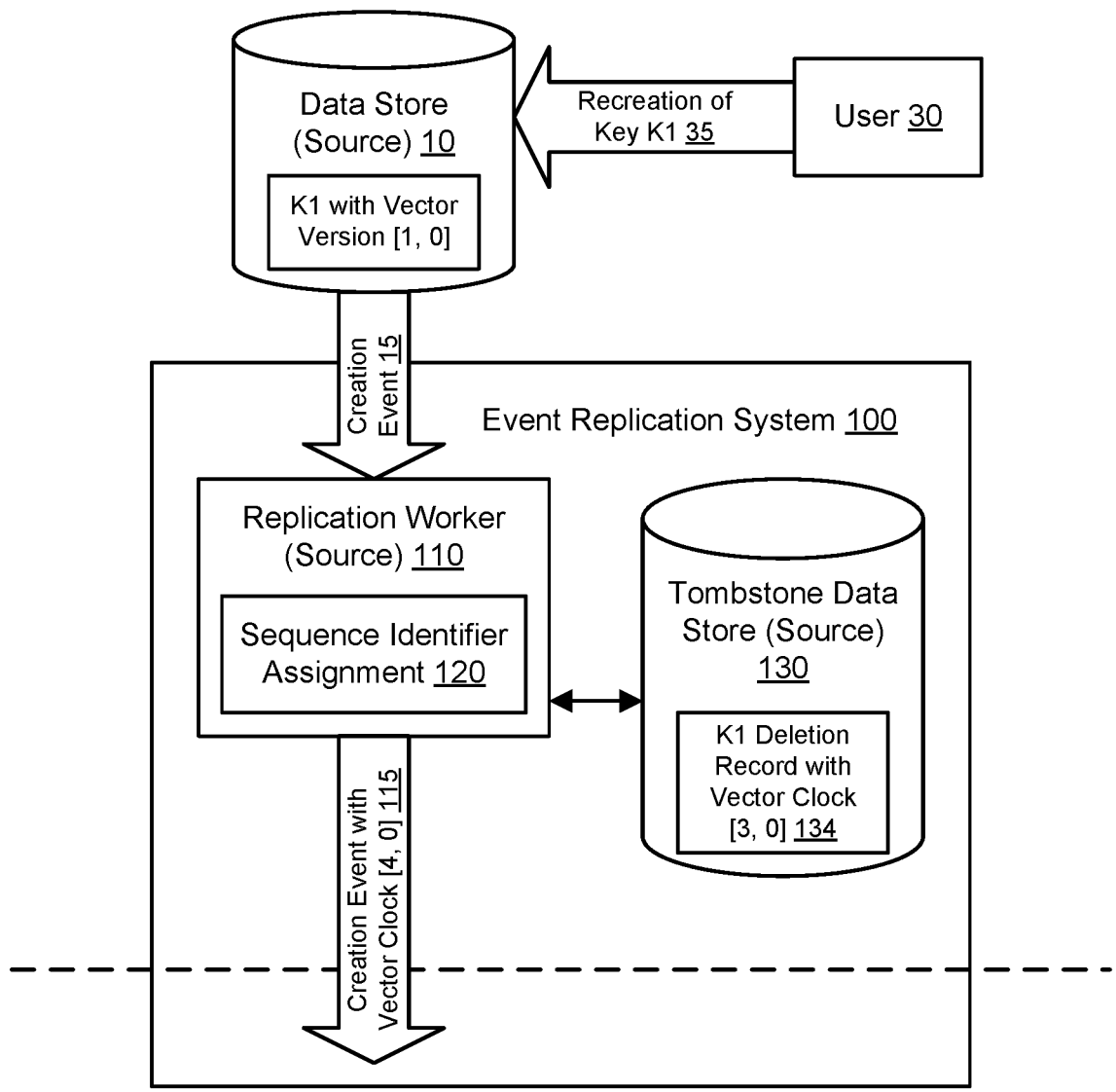

As shown in FIG. 4D, the user 30 may interact with the source data store using a request 35 for recreation of the key K1. As a result, the key K1 may be recreated in the source data store 10 with a vector version of [1, 0], where the first position in the vector represents the source node, and its value '1' indicates that the creation event 15 is the first in a restarted (post-deletion) sequence of events involving the key K1. The creation event 15 may be provided to a source replication worker 110, e.g., using an event stream. The worker 110 may check the source tombstone data store 130 to determine whether the key K1 has been deleted at any point in the past. In response to finding the deletion record 134, the sequence identifier assignment 120 may assign a new vector clock [4, 0] to the creation event 115 that is sent to one or more destinations for replication. In one embodiment, the new and modified vector clock [4, 0] may be generated by adding the vector clock [3, 0] of the deletion record to the vector clock [1, 0] of the recreated data for K1 in the source data store 10. By modifying the vector clock of the creation event 115 in this manner, the replication worker 110 may position the creation event 115 in a continuation of the same sequence that included the earlier deletion event.

Figure 4E:
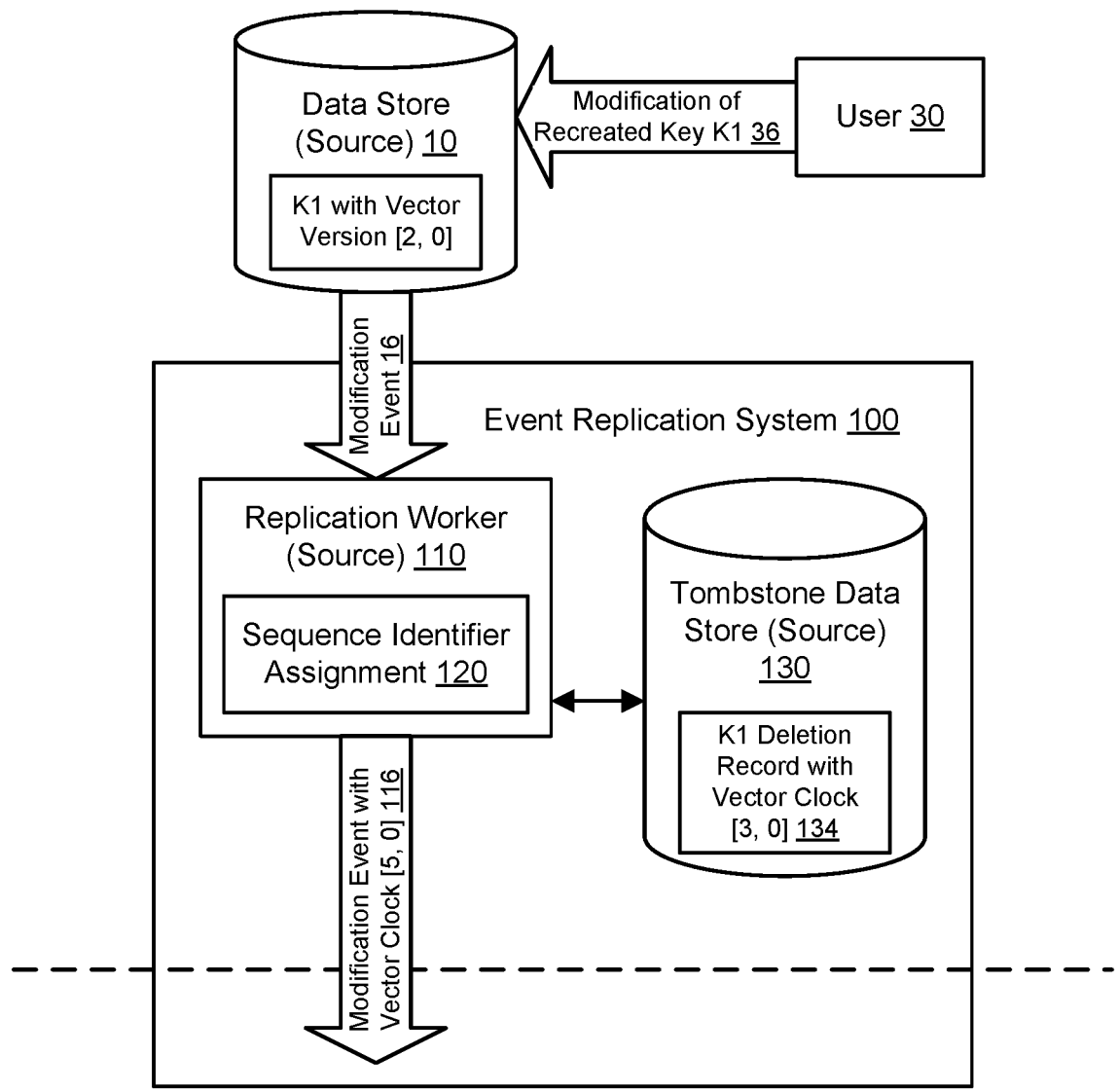

As shown in FIG. 4E, the user 30 may interact with the source data store using a request 36 for modification of the recreated key K1, e.g., by changing one or more values associated with K1. As a result, the data associated with the key K1 may be modified in the source data store 10 with a vector version of [2, 0], where the value '2' indicates that the modification event 16 is the second in the restarted (post-deletion) sequence of events involving the key K1. The modification event 16 may be provided to a source replication worker 110, e.g., using an event stream. The worker 110 may check the source tombstone data store 130 to determine whether the key K1 has been deleted at any point in the past. In response to finding the deletion record 134, the sequence identifier assignment 120 may assign a new vector clock [5, 0] to the modification event 116 that is sent to one or more destinations for replication. In one embodiment, the new and modified vector clock [5, 0] may be generated by adding the vector clock [3, 0] of the deletion record to the vector clock [2, 0] of the recreated and modified data for K1 in the source data store 10. By modifying the vector clock of the modification event 116 in this manner, the replication worker 110 may position the modification event 116 in a continuation of the same sequence that included the earlier deletion event.

Figure 5A:
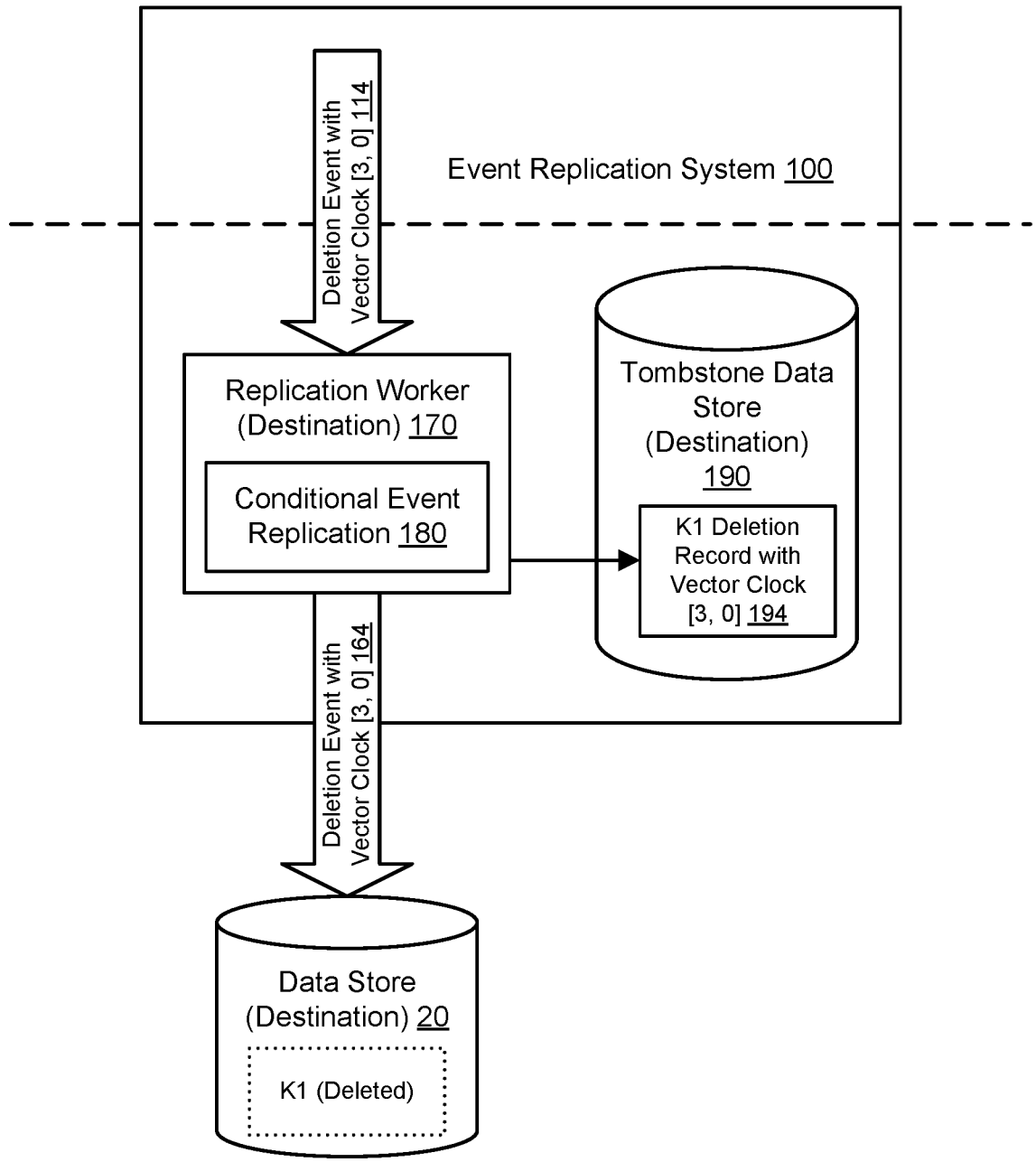
FIG. 5A through FIG. 5C illustrate examples of replication event ordering using an external data store, including conditional replication to a destination data store based on sequence numbers, according to one embodiment.
Figure 5B:
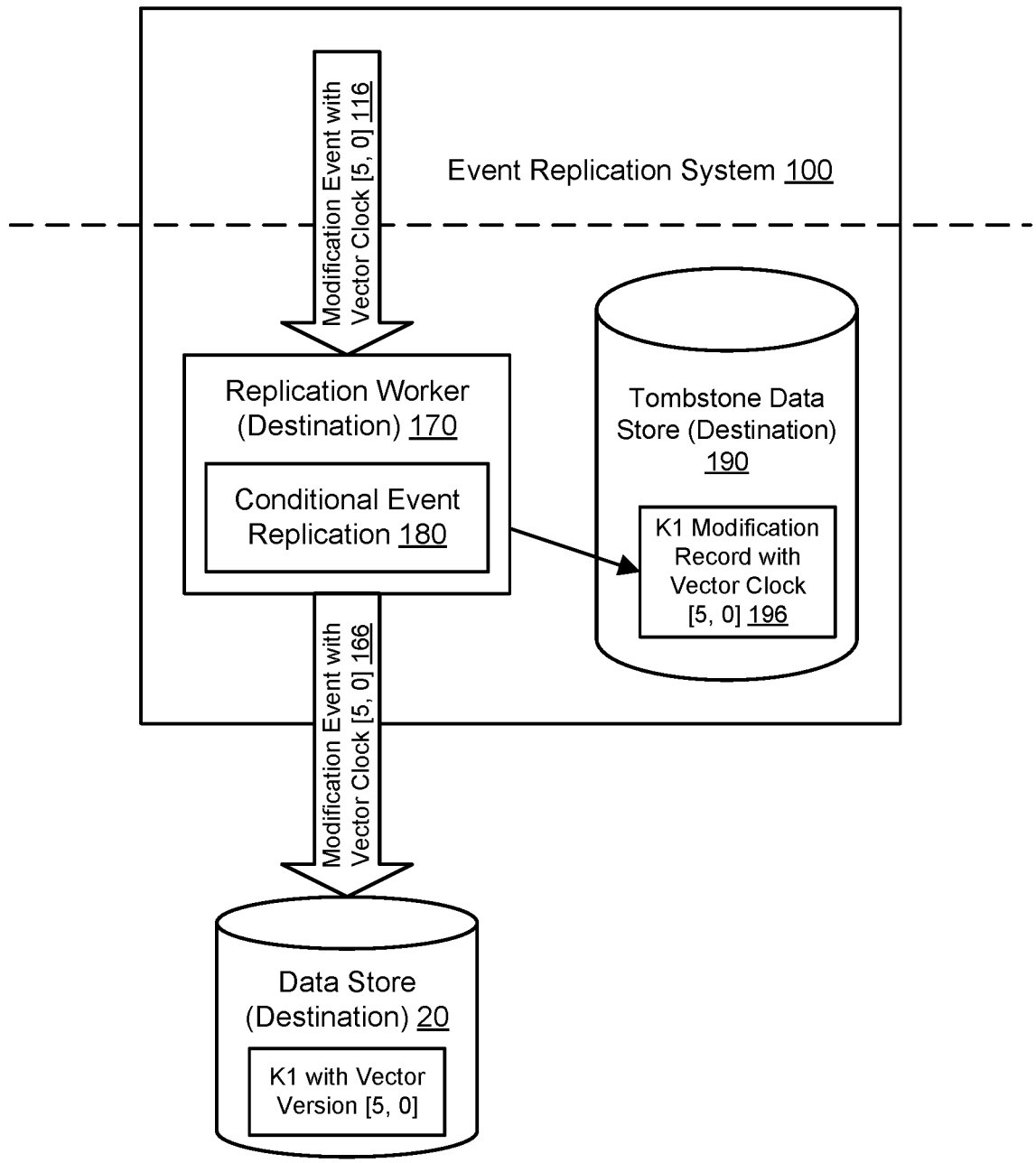
Figure 5C:
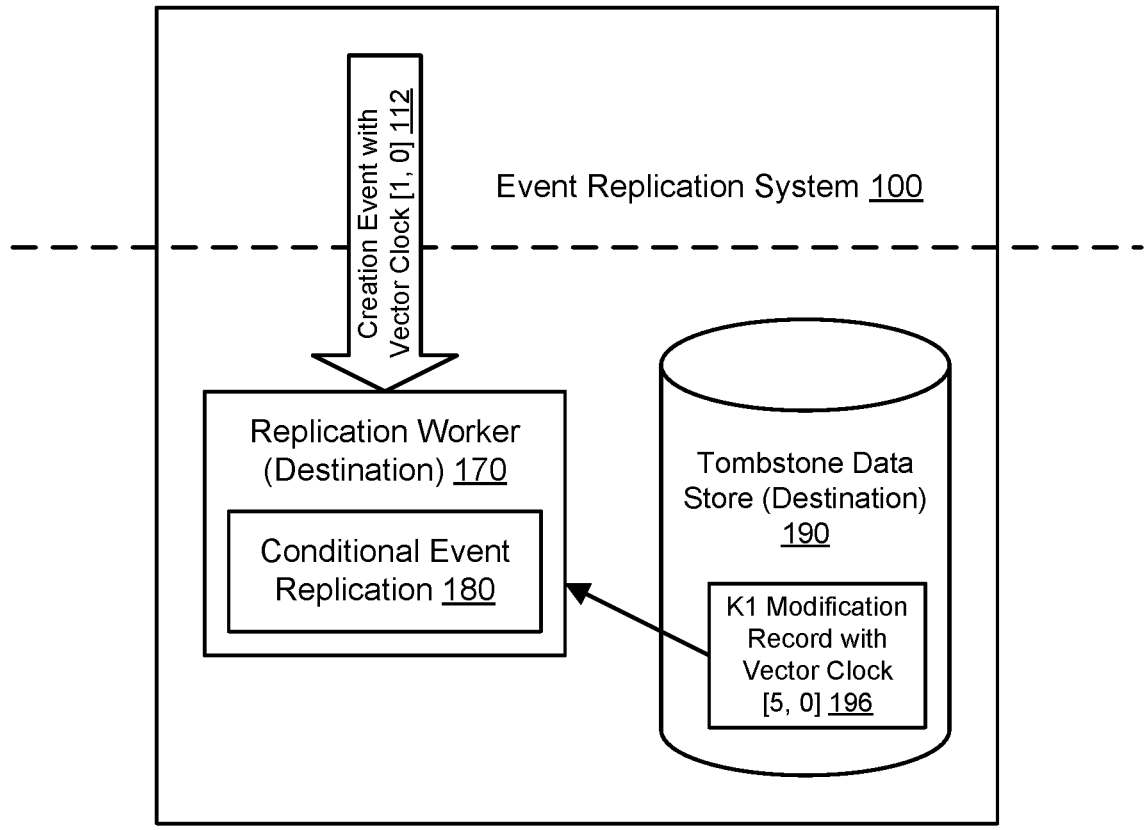
Figure 5C:
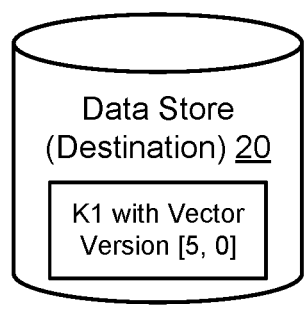

FIG. 5A through FIG. 5C illustrate examples of replication event ordering using an external data store, including conditional replication to a destination data store based on sequence numbers, according to one embodiment. In one embodiment, FIG. 5A through FIG. 5C may represent a series of events that affect a particular key (K1) in the destination data store 10. In one embodiment, any of the events 112, 113, 114, 115, or 116 may be received out of order on the destination side. The destination tombstone data store 190 may be used to determine the correct logical order of events and conditionally or selectively replicate events to the destination data store 20. In one embodiment, a component for conditional event replication 180 may replicate a K1-related event to the destination data store 20 if and only if a sequence identifier for the K1-related event indicates that it is later in the sequence than any K1-related event previously replicated to the destination data store.

As shown in FIG. 5A, a destination replication worker 170 may receive the deletion event 114 having a vector clock [3, 0]. The worker 170 may update the destination tombstone data store by logging a deletion record 194 for K1 and indicating the current vector clock [3, 0]. If K1 already exists in the destination data store 20, then the conditional event replication 180 may replicate the deletion event 164 to the data store 20 in order to delete the data associated with K1.

As shown in FIG. 5B, a destination replication worker 170 may receive the modification event 116 having a vector clock [5, 0] after receiving the deletion event 114. The worker 170 may update the destination tombstone data store by logging a modification record 196 for K1 and indicating the vector clock [5, 0]. Because the latest update applied to the destination data store 20 for K1 had a vector clock of [3, 0], and the modification event 116 has a vector clock of [5, 0] indicating a later position in the sequence, the conditional event replication 180 may apply the modification event 116 to the data store 20 in order to modify the data associated with K1.

As shown in FIG. 5C, a destination replication worker 170 may receive the creation event 112 having a vector clock [1, 0] after receiving the deletion event 114 and the modification event 116. The worker 170 may update the destination tombstone data store by logging a creation record 192 for K1 and indicating the vector clock [1, 0]. Because the latest update applied to the destination data store 20 for K1 had a vector clock of [5, 0], and the creation event 112 has a vector clock of [1, 0] indicating an earlier position in the sequence, the conditional event replication 180 may not apply the creation event 112 to the data store 20. In one embodiment, the creation event 112 may be logged in the tombstone data store 190 and then discarded without being applied to the destination data store 20.

Figure 6:
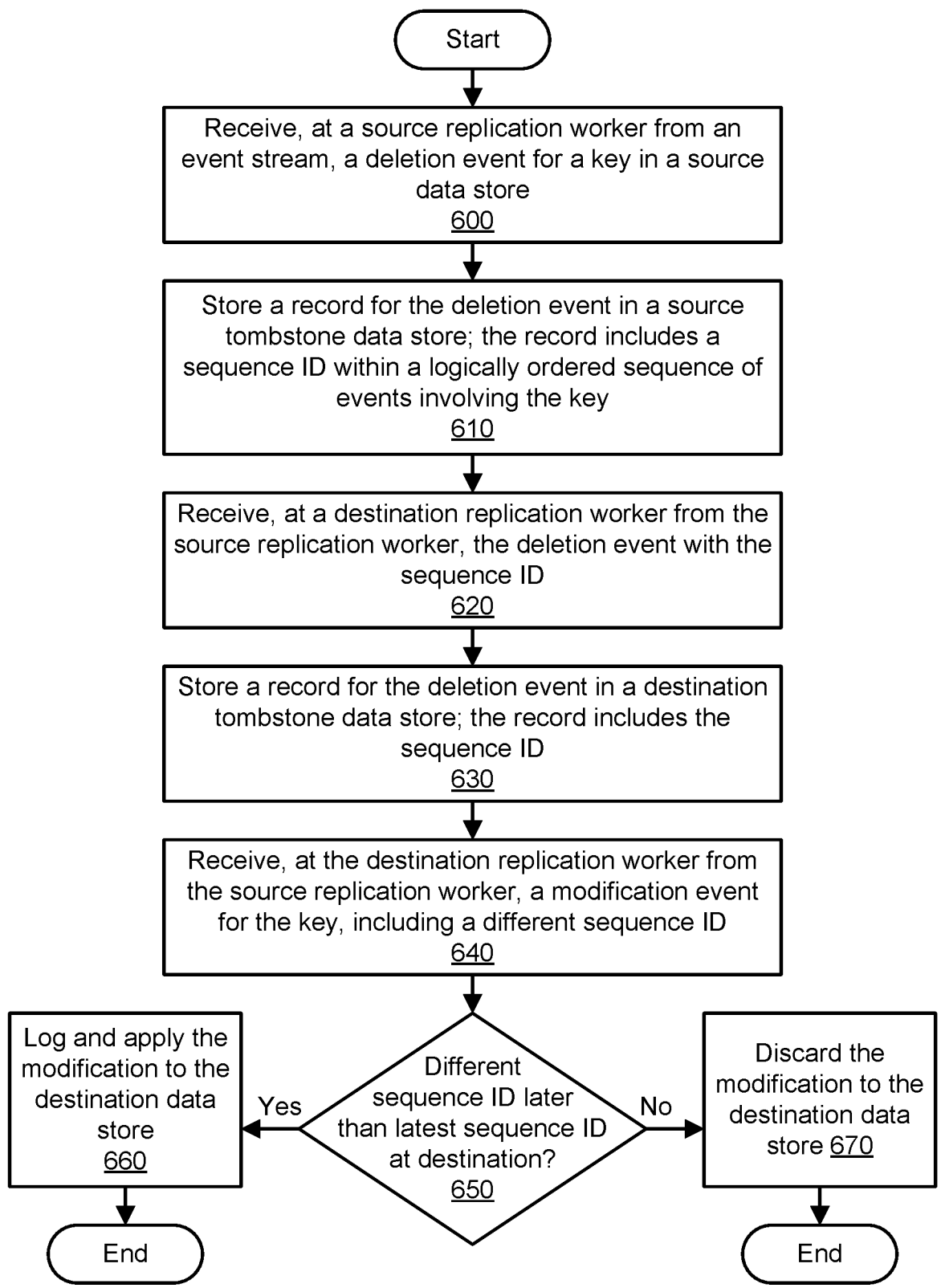
FIG. 6 is a flowchart illustrating a method for replication event ordering using an external data store, according to one embodiment.

FIG. 6 is a flowchart illustrating a method for replication event ordering using an external data store, according to one embodiment. As shown in 600, a deletion event for a partition key in a source data store may be received. The deletion event may be received by a source replication worker from an event stream that is monitored by the worker. The deletion event may include a sequence identifier that indicates the position of the event in a logically ordered sequence of events involving the same partition key. As shown in 610, a record of the deletion event may be stored in an external data store (referred to as a tombstone data store) on the source side. The record may be stored with the sequence identifier. In one embodiment, the sequence identifier may include a vector clock with monotonically increasing values over time.

As shown in 620, the deletion event may be received by a destination replication worker from the source replication worker. In one embodiment, the deletion event may be placed on an event stream by the source replication worker and then received by the destination replication worker that monitors the stream. As received by the destination replication worker, the deletion event may include the sequence identifier that indicates the position of the event in the logically ordered sequence of events involving the same partition key. As shown in 630, a record of the deletion event may be stored in an external data store (referred to as a tombstone data store) on the destination side. The record may be stored with the sequence identifier. In one embodiment, the deletion event may be replicated to the destination data store, e.g., to delete one or more values associated with the partition key.

As shown in 640, a modification event for the key may be received by the destination replication worker. The modification event may represent the creation or modification of one or more values associated with the key. In one embodiment, the modification event may be placed on an event stream by the source replication worker and then received by the destination replication worker that monitors the stream. As received by the destination replication worker, the modification event may include a different sequence identifier that indicates the position of the event in the logically ordered sequence of events involving the same partition key. In one embodiment, a record of the modification event may be logged to the destination tombstone data store.

Depending on its sequence identifier, the modification event may be replicated to the destination data store or dropped. As shown in 650, it may be determined whether the sequence identifier of the modification event is later than the latest sequence identifier replicated to the destination data store. In this example, the latest sequence identifier may belong to the deletion event that was logged to the tombstone data store in 630. As shown in 660, if the sequence identifier of the modification event is indeed later than the latest sequence identifier, then the modification event may be both logged to the destination tombstone data store and replicated to the primary destination data store. As shown in 670, however, if the sequence identifier of the modification event is not later than the latest sequence identifier, then the modification event may be logged to the destination tombstone data store but not replicated to the primary destination data store. As shown in FIG. 6, the use of sequence identifiers maintained in an external data store may enable a destination data store to be updated in an eventually consistent manner, even if events are delivered out of order, and even if some events occur after a deletion of their partition key.

Illustrative Computer System

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a source tombstone data store;
   a destination tombstone data store; and
   one or more computing devices configured to implement an event replication system comprising a source replication worker and a destination replication worker external to a source data store and a destination data store, wherein the event replication system is configured to:
   receive, by the source replication worker from an event stream, a deletion event indicative of a deletion of a key in the source data store;
   store, by the source replication worker in the source tombstone data store, first data indicative of the deletion event, wherein the first data comprises a sequence identifier of the deletion event in a sequence of events associated with the key;
   receive, by the destination replication worker from the source replication worker, the deletion event;
   store, by the destination replication worker in the destination tombstone data store, second data indicative of the deletion event, wherein the second data comprises the sequence identifier of the deletion event;
   receive, by the destination replication worker from the source replication worker, a modification event indicative of a modification of the key in the source data store, wherein a sequence identifier of the modification event is earlier than the sequence identifier of the deletion event in the sequence; and
   based at least in part on a comparison of the sequence identifier of the modification event to the sequence identifier of the deletion event stored in the destination tombstone data store, discard the modification event without replication to the destination data store.

2. The system as recited in claim 1, wherein the event replication system is further configured to:
   receive, by the destination replication worker from the source replication worker, an additional modification event indicative of an additional modification of the key in the source data store, wherein a sequence identifier of the additional modification event is later than the sequence identifier of the deletion event in the sequence; and
   based at least in part on a comparison of the sequence identifier of the additional modification event to the sequence identifier of the deletion event stored in the destination tombstone data store, log the additional modification event in the destination tombstone data store and replicate the additional modification event to the destination data store.

3. The system as recited in claim 1, wherein the event replication system is further configured to:
   receive, by the source replication worker from the event stream, one or more additional events modifying the key in the source data store and occurring after the deletion event, wherein the one or more additional events are associated with sequence numbers of a restarted sequence; and
   assign new sequence numbers to the one or more additional events, wherein the new sequence numbers represent a continuation of the sequence of events comprising the deletion event, and wherein the new sequence numbers are assigned based at least in part on the first data indicative of the deletion event stored in the source tombstone data store.

4. The system as recited in claim 1, wherein the source data store, the source tombstone data store, and the source replication worker are implemented in a first region of a distributed system, and wherein the destination data store, the destination tombstone data store, and the destination replication worker are implemented in a second region of the distributed system.

5. A computer-implemented method, comprising:
   receiving a plurality of events associated with a key in a source data store, by a source replication worker external to the source data store, wherein the events comprise a deletion event and a plurality of modification events;

storing, by the source replication worker, a record of the deletion event in an external data store, wherein the record comprises a sequence identifier of the deletion event;

assigning, by the source replication worker, sequence identifiers to the modification events, wherein the sequence identifiers of the modification events represent a logical order of the modification events in the sequence of events associated with the key, wherein the sequence identifiers of a first portion of the modification events are earlier than the deletion event in the sequence of events, and wherein the sequence identifiers of a second portion of the modification events are later than the deletion event in the sequence of events and are assigned based at least in part on the record of the deletion event in the external data store; and determining, by a destination replication worker external to a destination data store, whether to replicate individual ones of the sequence of events to the destination data store based at least in part on the sequence identifiers of the deletion event and modification events.

6. The method as recited in claim 5, further comprising: storing a sequence identifier of a latest replicated event in an additional external data store, wherein, in determining whether to replicate the individual ones of the events to the destination data store, the sequence identifiers of the events are compared to the sequence identifier of the latest replicated event stored in the additional external data store.

7. The method as recited in claim 6, further comprising: replicating one or more of the events to the destination data store based at least in part on the sequence identifiers.

8. The method as recited in claim 6, further comprising: discarding one or more of the events without replication to the destination data store based at least in part on the sequence identifiers.

9. The method as recited in claim 5, wherein at least some of the events are received at a destination in a different order than the sequence, and wherein an additional external data store at the destination is used to derive a logical order of at least some of the modification events and the deletion event based at least in part on the sequence identifiers.

10. The method as recited in claim 5, wherein the second portion of the modification events are associated with sequence identifiers of a restarted sequence, and wherein, in assigning the sequence identifiers to the modification events, the sequence identifier of the deletion event is added to the sequence identifiers of the restarted sequence.

11. The method as recited in claim 5, wherein the events are received by a source replication worker from an event stream, wherein the sequence identifiers are assigned by the source replication worker, and wherein the events including the sequence identifiers are received by a destination replication worker from the source replication worker.

12. The method as recited in claim 5, wherein the source data store and the external data store are implemented in a first region of a distributed system, and wherein the destination data store and an additional external data store are implemented in a second region of the distributed system.

13. A computer-readable storage medium storing program instructions computer-executable to perform:

receiving a plurality of events associated with a key in a source data store, by a source replication worker external to the source data store, wherein the events comprise a deletion event and a plurality of modification events;

storing, by the source replication worker, a record of the deletion event in a tombstone data store, wherein the record comprises a sequence identifier of the deletion event;

assigning, by the source replication worker, sequence identifiers to the modification events, wherein the sequence identifiers of the modification events represent a logical order of the modification events in the sequence of events associated with the key, wherein the sequence identifiers of a first portion of the modification events are earlier than the deletion event in the sequence of events, and wherein the sequence identifiers of a second portion of the modification events are later than the deletion event in the sequence of events and are assigned based at least in part on the record of the deletion event in the tombstone data store; and determining, by a destination replication worker external to a destination data store, whether to apply individual ones of the events to the destination data store based at least in part on the sequence identifiers of the deletion event and modification events.

14. The computer-readable storage medium as recited in claim 13, wherein the program instructions are further computer-executable to perform:

storing the sequence identifier of a latest replicated event in an additional tombstone data store, wherein, in determining whether to apply the individual ones of the events to the destination data store, the sequence identifiers of the events are compared to the sequence identifier of the latest replicated event stored in the additional tombstone data store.

15. The computer-readable storage medium as recited in claim 14, wherein the program instructions are further computer-executable to perform:

applying one or more of the events to the destination data store based at least in part on the sequence identifiers.

16. The computer-readable storage medium as recited in claim 14, wherein the program instructions are further computer-executable to perform:

discarding one or more of the events without replication to the destination data store based at least in part on the sequence identifiers.

17. The computer-readable storage medium as recited in claim 13, wherein at least some of the events are received at a destination in a different order than the sequence, and wherein an additional tombstone data store at the destination is used to derive a logical order of at least some of the modification events and the deletion event based at least in part on the sequence identifiers.

18. The computer-readable storage medium as recited in claim 13, wherein the second portion of the modification events are associated with sequence identifiers of a restarted sequence, and wherein, in assigning the sequence identifiers to the modification events, the sequence identifier of the deletion event is added to the sequence identifiers of the restarted sequence.

19. The computer-readable storage medium as recited in claim 13, wherein the events are received by a source replication worker from an event stream, wherein the sequence identifiers are assigned by the source replication worker, and wherein the events including the sequence identifiers are received by a destination replication worker from the source replication worker.

20. The computer-readable storage medium as recited in claim 13, wherein the source data store and the tombstone data store are implemented in a first region of a provider network, and wherein the destination data store and an additional tombstone data store are implemented in a second region of the provider network.

\* \* \* \* \*